(12) United States Patent
Crow et al.

(10) Patent No.: US 7,955,106 B1
(45) Date of Patent: Jun. 7, 2011

(54) FLEX CONNECTOR AND MANUFACTURING PROCESS

(75) Inventors: Derek Crow, Wayland, MI (US); Dave Emery, Muskegon, MI (US); Steve King, Holland, MI (US); Duane Danz, Grand Rapids, MI (US); Jonathan R. DeYoung, Grand Rapids, MI (US); Jason Elzinga, Hudsonville, MI (US); Mark Wiersema, Holland, MI (US); Doug Moerler, Marne, MI (US); Scott Leenstra, Byron Center, MI (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 12/661,220

(22) Filed: Mar. 12, 2010

(51) Int. Cl.
*H01R 4/60* (2006.01)

(52) U.S. Cl. .......................... 439/215; 29/857

(58) Field of Classification Search .......... 439/207–216; 29/857
See application file for complete search history.

(56) References Cited

U.S. PATENT DOCUMENTS

| | | | |
|---|---|---|---|
| 3,691,509 A | 9/1972 | Krol | |
| 3,904,261 A | 9/1975 | Cooney | |
| 4,687,263 A | 8/1987 | Cosmos et al. | |
| 4,775,328 A | 10/1988 | McCarthy | |
| 4,781,609 A * | 11/1988 | Wilson et al. | 439/215 |
| 4,862,922 A | 9/1989 | Kite, III | |
| 5,057,650 A | 10/1991 | Urushibata et al. | |
| 5,092,786 A * | 3/1992 | Juhlin et al. | 439/215 |
| 5,092,787 A * | 3/1992 | Wise et al. | 439/215 |
| 5,158,472 A * | 10/1992 | Juhlin | 439/215 |
| 5,186,640 A * | 2/1993 | McCoy | 439/211 |
| 5,214,889 A * | 6/1993 | Nienhuis et al. | 52/220.7 |
| 5,236,370 A * | 8/1993 | King et al. | 439/215 |
| 5,244,401 A * | 9/1993 | Russell et al. | 439/215 |
| 5,252,081 A | 10/1993 | Hart | |
| 5,310,362 A | 5/1994 | Bauerle et al. | |
| 5,349,135 A * | 9/1994 | Mollenkopf et al. | 174/497 |
| 5,562,469 A * | 10/1996 | Nienhuis et al. | 439/215 |
| 5,607,317 A * | 3/1997 | King et al. | 439/215 |
| 5,784,841 A * | 7/1998 | Nowell | 52/220.5 |
| 5,785,542 A * | 7/1998 | Johnson | 439/213 |
| 5,860,832 A | 1/1999 | Wayt et al. | |
| 6,443,758 B2 | 9/2002 | Nagai | |
| 6,561,465 B2 | 5/2003 | Kondo | |
| 6,746,269 B1 | 6/2004 | Casses | |
| 6,793,520 B1 | 9/2004 | Wu | |
| 6,835,081 B2 * | 12/2004 | Plattner et al. | 439/215 |
| 6,910,903 B2 * | 6/2005 | Kondas | 439/215 |
| 6,991,485 B2 * | 1/2006 | Plattner et al. | 439/215 |
| 7,114,972 B1 * | 10/2006 | Riner | 439/215 |
| 7,294,005 B1 * | 11/2007 | Laukhuf | 439/215 |
| 7,494,356 B2 * | 2/2009 | Byrne | 439/215 |
| 7,520,762 B2 * | 4/2009 | Lehman et al. | 439/115 |
| 7,699,631 B2 * | 4/2010 | Knepper | 439/215 |
| 2002/0137381 A1 * | 9/2002 | Chapman et al. | 439/215 |
| 2003/0109171 A1 | 6/2003 | Morgan | |

(Continued)

*Primary Examiner* — Ross N Gushi
(74) *Attorney, Agent, or Firm* — Flynn, Thiel, Boutell & Tanis, P.C.

(57) ABSTRACT

A modular power distribution system includes power distribution assemblies and flex connectors. The flex connector includes end connector housings and a flexible jacket that encloses conductor wires extending between the connectors. The jacket is formed from superimposed layers of sheet-like jacket material that is flexible. The bottom jacket layer is first laid on a bottom housing section wherein conductors are then placed thereupon with an upper jacket layer then positioned over the bottom jacket layer. The top and bottom jacket layers have aligned free edges along at least one side thereof wherein the free edges are bonded together such as by heat sealing.

20 Claims, 9 Drawing Sheets

U.S. PATENT DOCUMENTS

| | | |
|---|---|---|
| 2004/0102072 A1* | 5/2004 | Plattner et al. ................ 439/215 |
| 2005/0095890 A1* | 5/2005 | Plattner et al. ................ 439/215 |
| 2005/0130476 A1* | 6/2005 | Kochanski ................... 439/215 |
| 2006/0024996 A1* | 2/2006 | Johnson et al. ............... 439/215 |
| 2006/0035499 A1* | 2/2006 | Johnson et al. ............... 439/215 |
| 2006/0052009 A1* | 3/2006 | Johnson et al. ............... 439/660 |
| 2008/0045060 A1* | 2/2008 | Knepper ...................... 439/215 |
| 2008/0102673 A1 | 5/2008 | Riner et al. |
| 2008/0293276 A1* | 11/2008 | Riner ........................... 439/215 |
| 2009/0221169 A1* | 9/2009 | Byrne .......................... 439/211 |
| 2009/0239403 A1* | 9/2009 | Byrne .......................... 439/215 |
| 2010/0048050 A1* | 2/2010 | Riner ........................... 439/215 |
| 2010/0184316 A1* | 7/2010 | Byrne .......................... 439/215 |
| 2010/0190369 A1* | 7/2010 | Byrne .......................... 439/215 |

* cited by examiner

FLEX CONNECTOR AND MANUFACTURING PROCESS

FIELD OF THE INVENTION

The invention relates to a modular electrical power distribution system and more particularly, to an improved flex connector for such system having a flexible jacket and to an improved manufacturing process for assembling such flex connector.

BACKGROUND OF THE INVENTION

Modular power distribution systems are well known and comprise a plurality of modular electrical components which are connectable serially together to route power throughout an office area. These power distribution systems often include elongate power distribution assemblies (PDAs) which are mountable within raceways of conventional space-dividing wall panels, furniture or other static structures such as building raceways.

One known power distribution assembly comprises an elongate rigid mounting rail which extends substantially along the length of a wall panel and supports a pair of connector blocks or power blocks on the opposite ends thereof. The support rail houses elongate electrical conductors or wires therein which conductors define a plurality of electrical circuits and carry such circuits between said power blocks. In this regard, the conductors typically define multiple circuits of hot, neutral and ground conductors.

These conductors extend into the power blocks and have their opposite terminal ends electrically connected to individual conductor strips or terminals within the power blocks. As such, the electrical circuits extend through the longitudinal length of the PDA wherein the power blocks include plug ports that provide access to the individual terminals and allow for plugging engagement of additional electrical system components thereto such as flex connectors, receptacles and the like.

Examples of such an electrical system are disclosed in U.S. Pat. No. 4,367,370 (Wilson et al.), U.S. Pat. No. 4,781,609 (Wilson et al.), U.S. Pat. No. 6,123,562 (King et al.) and U.S. Pat. No. 7,114,971 B1 (Johnson et al.), which are owned by Haworth, Inc., the co-Assignee of the present invention, and the disclosure of which patents is incorporated herein by reference.

Furthermore, a commercially available electrical distribution system is sold by Haworth, Inc. under the trademark Power Base. In the Power Base electrical system, the PDA's have relatively long, modular lengths which generally correspond to the modular length of a static structure such as a space-dividing wall panel. To join two serially adjacent PDA's together, a flex connector is provided with connector plugs at the opposite ends thereof wherein a cable extends between the connector plugs to span the space between the PDA's. Each of the connector plugs can plug into the power block of the PDA associated therewith such that the multiple circuits are carried from one PDA to the next PDA through the flex connector therebetween.

As to a known flex connector of the Power Base system, this flex connector includes a molded plastic cover enclosing the conductors, which cover includes transverse slots along the length thereof to facilitate flexing or bending of the flex connector. However, such plastic cover is relatively thick and has a relatively rigid, rectangular cross-section, such that the plastic cover still has resistance to bending and twisting of the cover. Further, the slots open into the interior of the cover which exposes portions of the conductors.

It is an object of the invention to develop an improved flex connector which has a simplified construction which facilitates assembly of the flex connector and permits bending of the flex connector during installation.

The invention therefore relates to a flex connector for modular power distribution systems of this type which incorporates an inventive flexible jacket which is joined at its opposite ends to the end connector housings and readily facilitates flexing, bending and even twisting of the flex connector.

The flex connector generally comprises end housings which define the connector plugs that allow for plugging connection of the flex connector between two serially adjacent PDAs provided as part of the electrical system. These housings contain a plurality of contact terminals therein wherein the contact terminals seat in the housings at the opposite ends of the flex connector and are connected together by lengths of the wire-like conductors that extend longitudinally between the opposite ends of the flex connector. These conductors have relatively long lengths such that the intermediate sections of the conductors span the space between the connector housings.

In a typical wall panel installation, the flex connectors extend between the raceways of two different wall panels, wherein the middle section of the flex connector must span or pass over vertical frame rails of the wall panels. There is minimal clearance space over these frame rails such that the conductors preferably are laid flat in parallel, side-by-side relation to minimize the height of the conductor bundle.

However, it can be undesirable to allow these conductors to remain exposed in use and as such, the inventive flex connector is provided with a flexible jacket which is formed in a relatively flat configuration and completely encloses the conductors which are laid side-by-side within the jacket. The opposite ends of the jacket are secured to the connector housings.

More particularly as to the jacket, the jacket is formed of one or more thin sheets of flexible jacket material, preferably plastic sheets, which define top and bottom jacket layers that are superimposed one above the other. The jacket layers may be formed as two separate layers laid one above the other, or may be formed from a single sheet of jacket material which is folded with the top layer folded above the bottom layer to enclose the conductors in parallel relation between the two jacket layers.

Once the jacket layers are positioned one above the other, whether by folding or positioning of two separate jacket sheets one above the other, the jacket layers have free edges which extend along at least one of the side edges of the jacket. These free edges are aligned and then immovably bonded to each other such as by heat sealing, adhesives or other suitable securing methods. This provides for fixed securement or fastening of the free edges of the jacket layers one to the other to enclose the parallel conductors within the hollow interior of the jacket. Since the jacket is formed from flexible sheet material, the flex connector has substantial flexibility for both bending and twisting while also maintaining the conductors in a row in parallel sidewardly adjacent relation to define a thin profile.

This provides for an improved structure of the flex connector. Further, the manufacturing process is improved.

The manufacturing process comprises the steps of: first positioning bottom housing sections in spaced apart locations which housing sections have a locator pin therein; laying a bottom layer of jacket material so that alignment holes at the opposite ends of the bottom sheet fit onto the locator pins; positioning the conductor wires on top of the bottom jacket layer with electrical terminals on the opposite ends of the conductors being positioned within the bottom housing section; positioning a top jacket layer so as to overlie the parallel conductors with alignment holes in the top layer being fitted on the locator pins so that the top and bottom jacket layers are aligned; positioning a top housing section on the bottom housing section and permanently securing same together so that the housing is finished wherein the finished housing fixedly secures the opposite ends of the jacket within the housing; and bonding the aligned, free edges of the top and bottom jacket layers together along their length which provides for fixed securement of the jacket layers along such free edges. This thereby provides an improved manufacturing process for assembling flex connectors of this type.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 1:
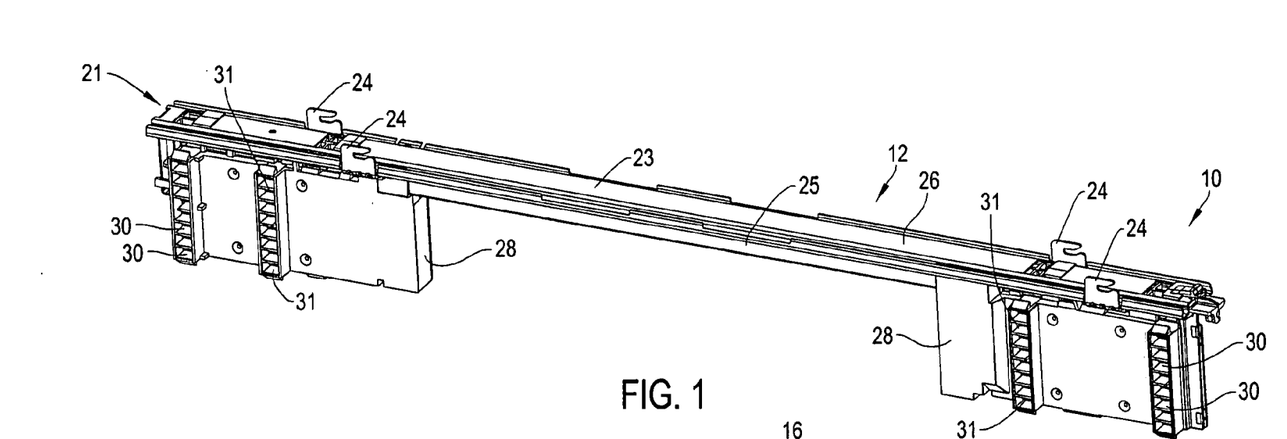
FIG. 1 is a perspective view of a power distribution assembly (PDA) according to the invention.
Figure 2:
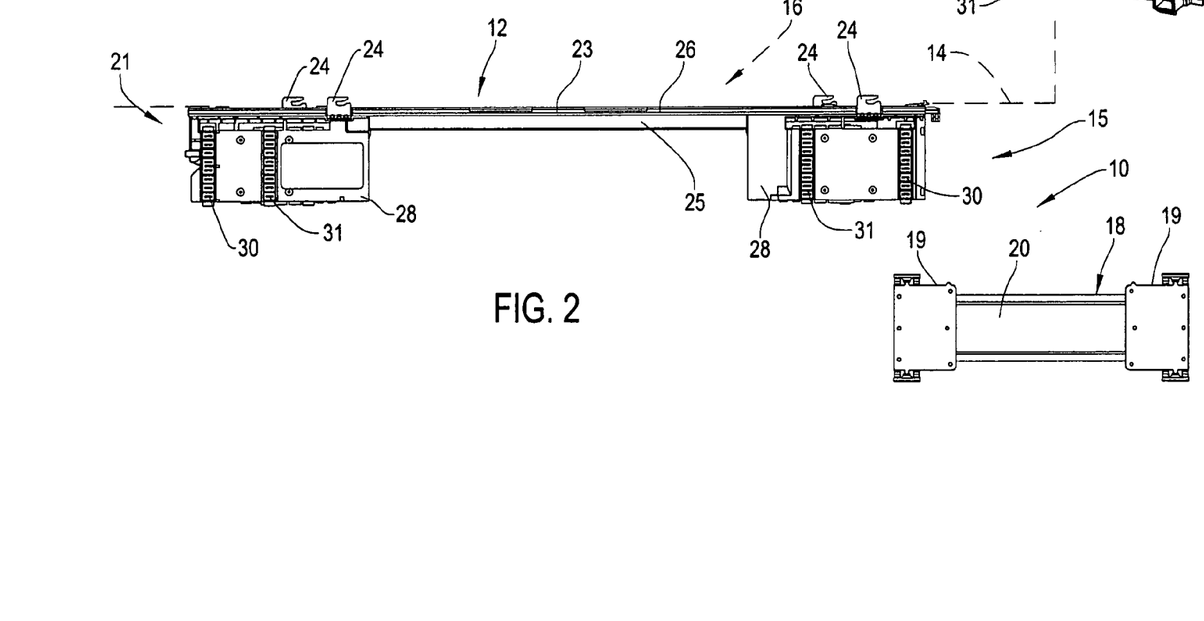
FIG. 2 is a front elevational view of the PDA in combination with a flex connector which is engageable with PDAs to join adjacent PDAs together.

Referring to FIG. 1, the invention relates to an improved power distribution system 10 which is provided to route power throughout an office area. The power distribution system 10 includes various modular system components, which system components include a power distribution assembly 12 (PDA) which is adapted to be mounted within raceways of various building structures such as space-dividing wall panels, furniture or other static structures. The PDA 12 is configured to mount to wall panel frame rails or other similar static structure which is generally identified by reference numeral 14 (FIG. 2). The frame rail 14 or other similar structure typically defines a longitudinally extending raceway 15 in which the PDA 12 is mountable. The frame rail 14 extends along the length of a wall panel identified by reference numeral 16 wherein each PDA 12 has a length closely conforming to the length of the wall panel 16.

At the junction between adjacent wall panels 16, the power system 10 also includes a flex connector 18 which has connector plugs 19 at the opposite ends that are adapted to plug into the ends of the adjacent PDAs 12. FIG. 2 illustrates the flex connector 18 offset downwardly but aligned with the PDA 12 prior to plugging engagement therewith.

The present invention relates to an improvement in the flex connector 18.

The flex connector 18 includes a conductor jacket 20 which extends between the connector plugs 19 and has a length selected to span the gap between the PDAs 12 provided in the adjacent wall panels 16. This conductor jacket 20 is flexible so as to allow relative bending between the connector plugs 19 such as for bending around a corner between one wall panel 16 and another wall panel 16 oriented perpendicular to the first wall panel 16.

As to the construction of the PDA 12, such PDA 12 includes a conductive metal support rail 23 which extends along the length of the PDA 12, and includes a plurality of mounting hooks 24 which project upwardly and are configured to hookingly engage into the frame rail 14 of the wall panel 16. The support rail 23 includes a channel cover 25 which mounts to the main support rail body 26 to define an interior channel through which a plurality of conductor wires extend. Additionally, each PDA 12 includes a power block 28 on each opposite end which is supported in downwardly depending relation from the support rail 23. The power blocks 28 connect to the conductor wires and serve the function of providing access to the plurality of circuits carried by the conductor wires to permit plugging engagement of additional system components thereto.

For example, each power block 28 includes first groups of plug ports 30 which are disposed proximate the outermost or outboard ends of the power blocks 28. These plug ports 30 provide access to interior power block terminals which form part of the plurality of electrical circuits carried through the PDA 12. The flex connector 18 is pluggable into these plug ports 30 so that the multiple circuits are carried from the PDA 12 through the flex connector 18 to the next adjacent PDA 12 in another wall panel 16.

Additional plug ports 31 are provided in vertical rows inboard of the plug ports 30. These plug ports 31 allow for plugging engagement of additional system components thereto, and most typically, a plug-in receptacle which plugs into the ports 31. The receptacle includes conventional three-prong plug openings or other conventional arrangements of plug openings which are then accessible from the exterior of the wall panel 16 and allow for various types of office equipment, such as computers, to be conventionally plugged therein.

Referring to FIGS. 3-6, the flex connector 18 comprises the connector plugs 19 at the opposite ends of the flex connector 18, which connector plugs 19 have the jacket 20 extending longitudinally therebetween. These connector plugs 19 comprise a housing assembly 33 which is formed of a bottom housing 34 and a housing cover 35 which mates to the bottom housing 34, wherein the housing assembly 33 secures to the opposite ends of the jacket 20 as will be described in further detail hereinafter.

Figure 9:
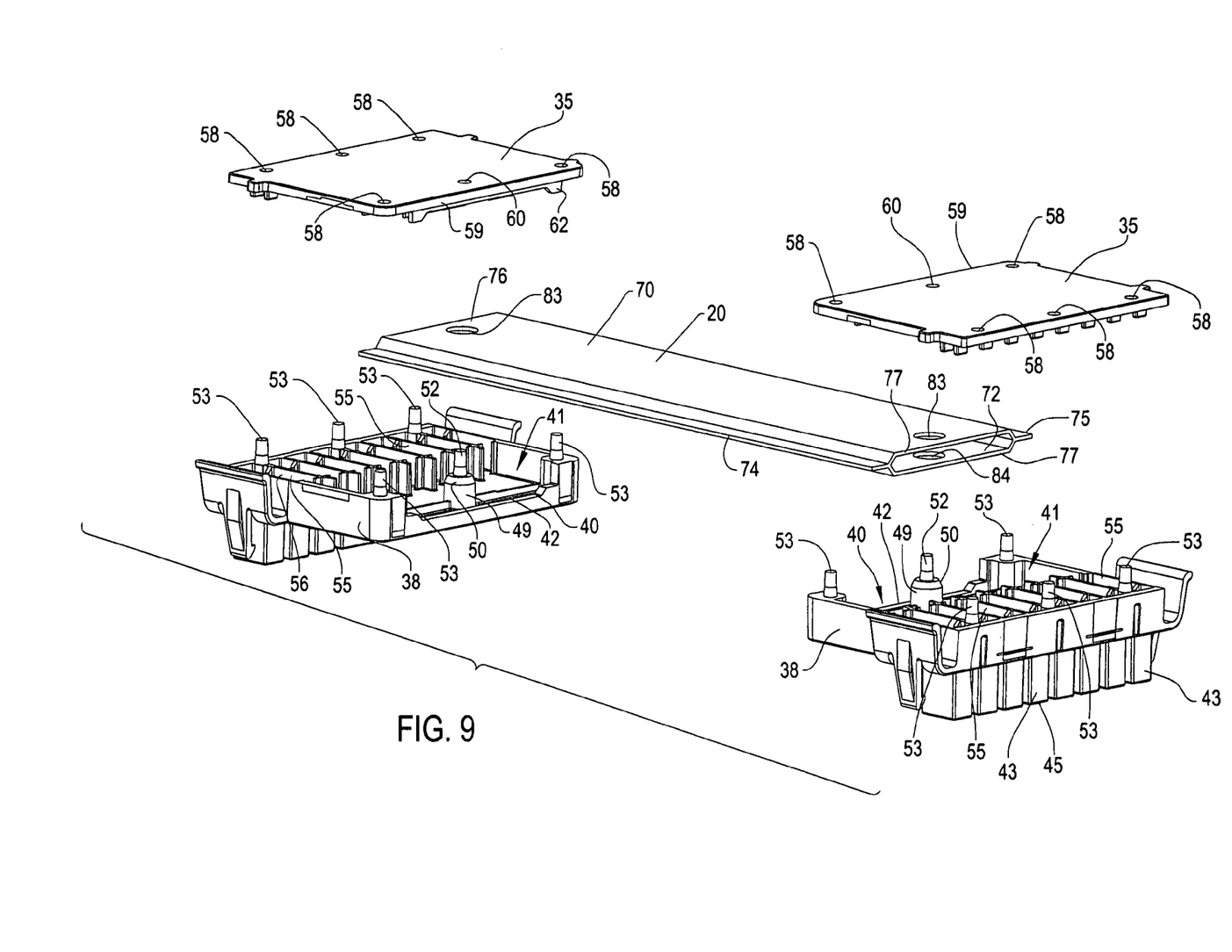
FIG. 9 is an exploded view of the flex connector.

The bottom housing 34 includes a bottom wall 37 and a peripheral side wall 38. As seen in FIG. 9, the side wall 38 extends about three sides of the periphery of the bottom housing 34, and on the inboard side, the side wall 38 defines a window 40 which opens into the hollow interior 41 of the bottom housing 34 to receive a respective one of the opposite ends of the jacket 20. The closed side of the window 40 is defined by a short flange 42.

The bottom wall 37 further includes a row of upstanding terminal shrouds 43 which project therefrom, are rectangularly shaped and are hollow so as to receive contact terminals 44 (FIG. 5) therein. This row of shrouds 43 is configured to be received within or mate with the row of plug ports 30 in a male/female connection so that the flex connector terminals 44 are able to engage corresponding terminals disposed within the PDA 12 to effect an electrical connection therebetween.

In this regard, the shrouds 43 have a passage extending from the bottom ends 45 (FIG. 4) of the shrouds 43, which passages open vertically into the hollow interior 41 of the bottom housing 34. This allows the aforementioned terminals 44 seat within the shrouds 43 from the hollow interior 41. When such terminals 44 are seated within the shrouds 43, the housing cover 35 can then be installed to hold the terminals 44 in the bottom housing 34.

Figures 6, 7, 8:
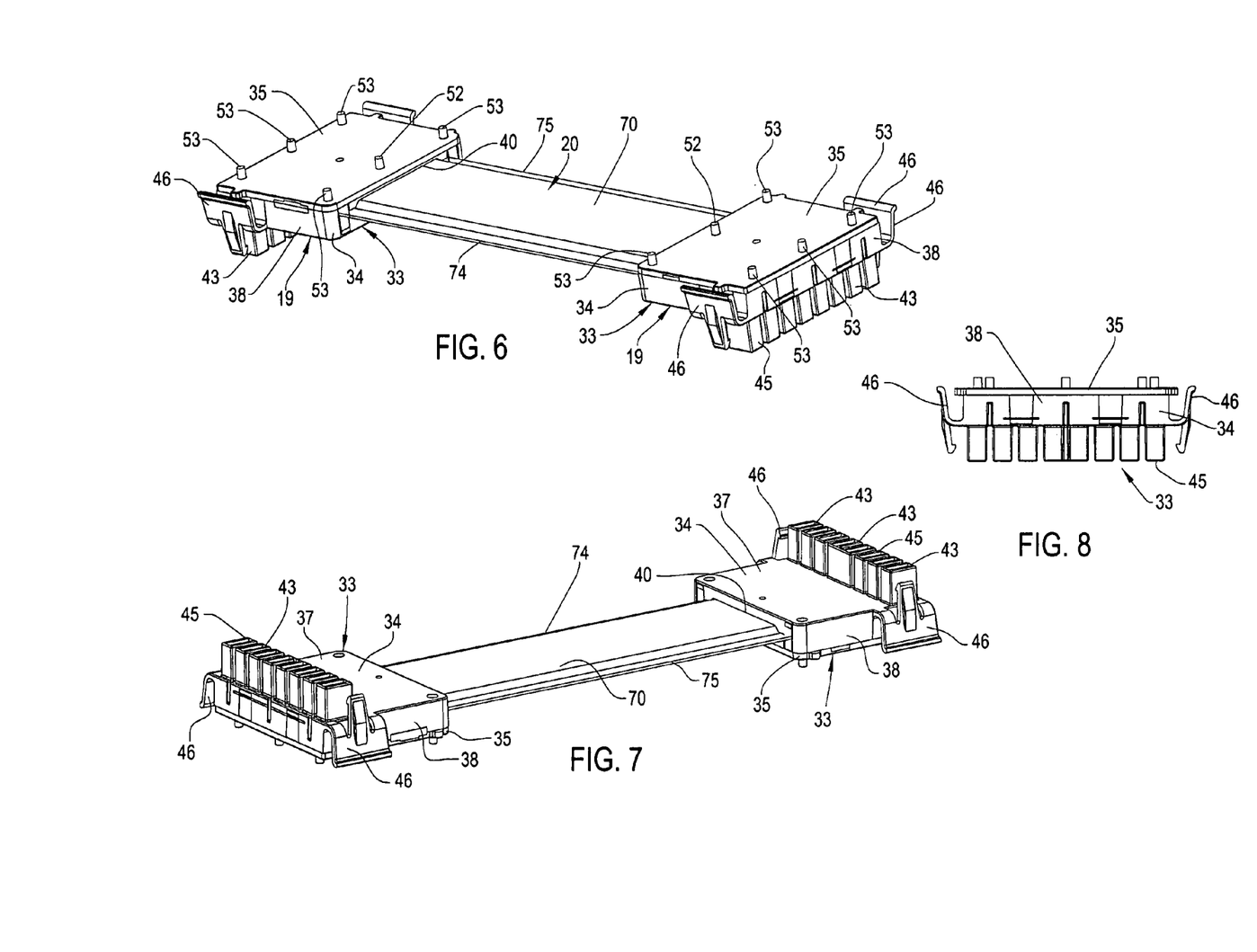
FIG. 6 is a top perspective view thereof.
FIG. 7 is a bottom perspective view thereof.
FIG. 8 is an end view thereof.

Referring to FIGS. 6-8, the peripheral side wall 38 further is formed with cantilevered locking catches 46 which are resiliently deflectable and lockingly secure the connector plug 19 to the PDA 12.

Figure 11:
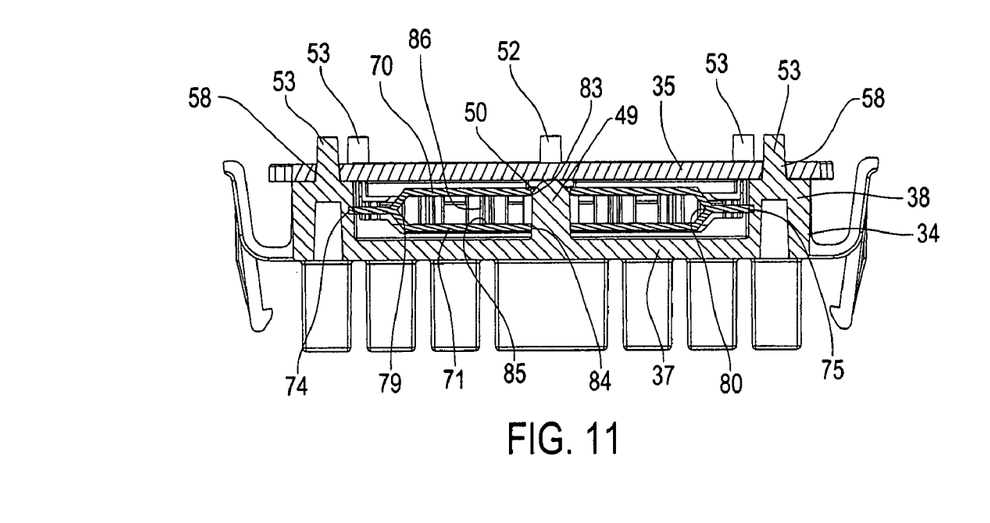
FIG. 11 is an end cross-sectional view as taken along line 11-11 of FIG. 3.
Figure 12:
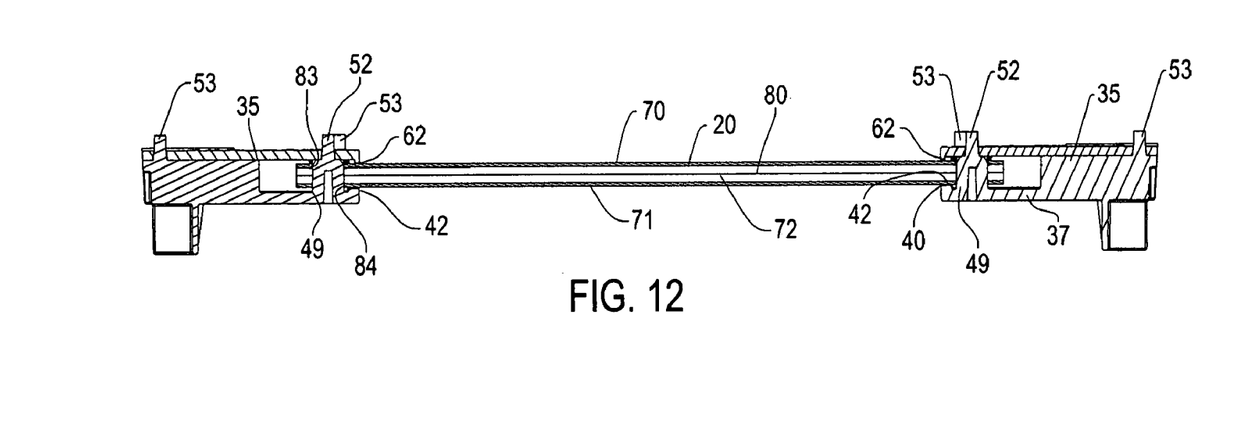
FIG. 12 is a side cross-sectional view as taken along line 12-12 of FIG. 3.

More particularly as to FIGS. 9, 11 and 12, each of the bottom housings 34 includes an upstanding locator post 49 which is centrally located on the longitudinal axis of the housing 34 and is located inboard of but closely adjacent to the window 40. The locator post 49 has a relatively thick diameter wherein the upper end of this post 49 has a beveled circumferential edge 50. On the upper end face of the locator post 49, a connector pin 52 projects upwardly so as to project through the housing cover 35 as generally seen in FIGS. 6 and 11. The bottom housing 34 also includes a plurality of additional connector pins 53 which project upwardly from the peripheral side wall 38 as seen in FIG. 9. These pins 53, similar to pins 52, project through the cover 35 as seen in FIG. 6 to secure the cover 35 to the housing 34. The fastening of the cover 35 to the bottom housing 34 will be described in further detail hereinafter.

Referring additionally to FIG. 9, the bottom housing 34 also includes a plurality of spaced-apart divider walls 55 which are located proximate the passages extending through the shrouds 43. The divider walls 55 define a plurality of pockets 56 arranged in a row into which the aforementioned contact terminals 44 are positioned so that said terminals 44 fixedly seat within the respective shroud 43 and are accessible through the exterior open end of the shroud passage.

As to the top cover 35, the top cover 35 preferably is formed as a thin, plate-like structure which is adapted to fit over and enclose the hollow interior 41 of the bottom housing 34. It will be understood that the housing assembly 33 could be constructed with different shapes and depths for the housing 34 and cover 35 without departing from the present invention.

Figure 3:
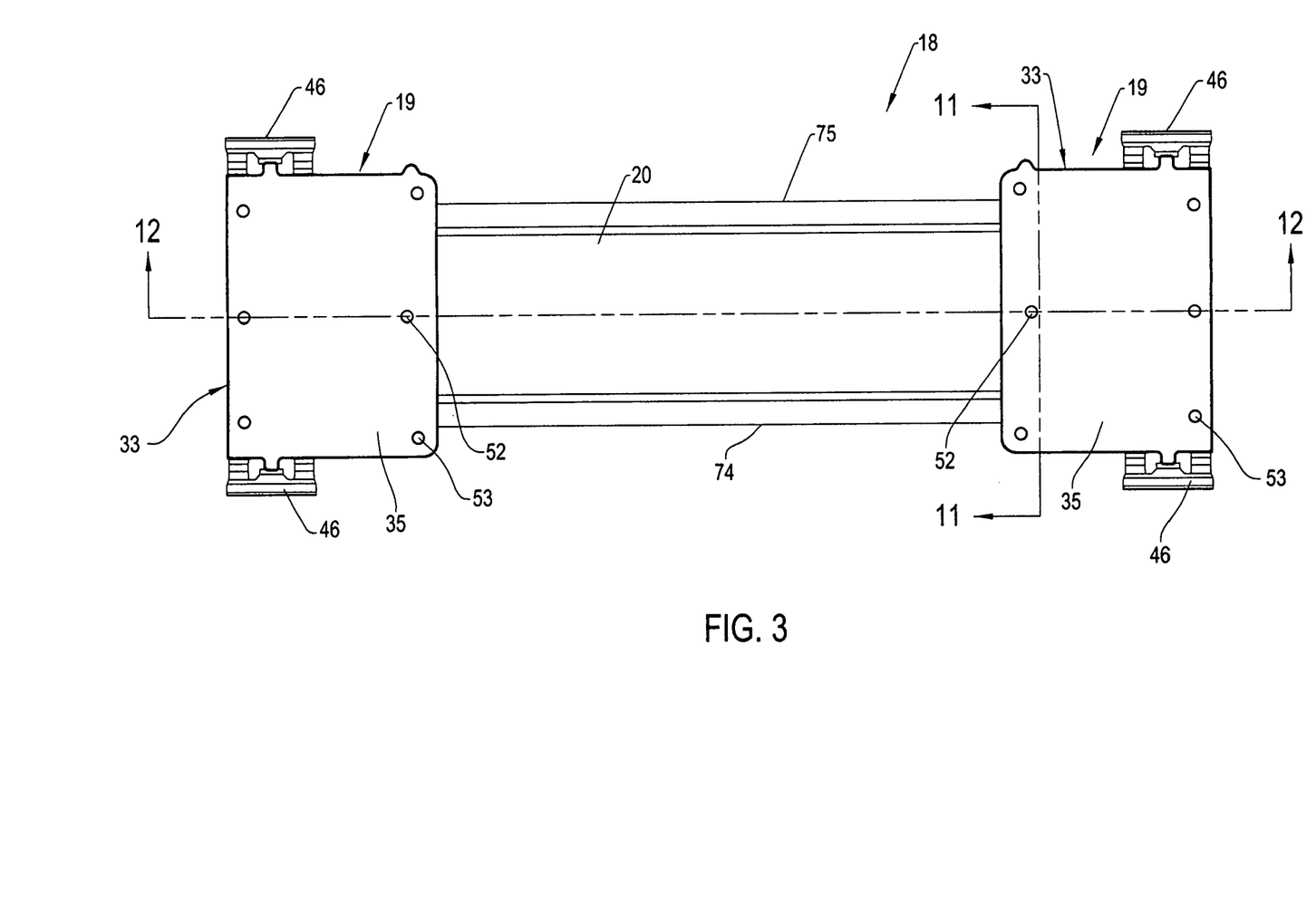
FIG. 3 is a top view of the flex connector.
Figure 4:
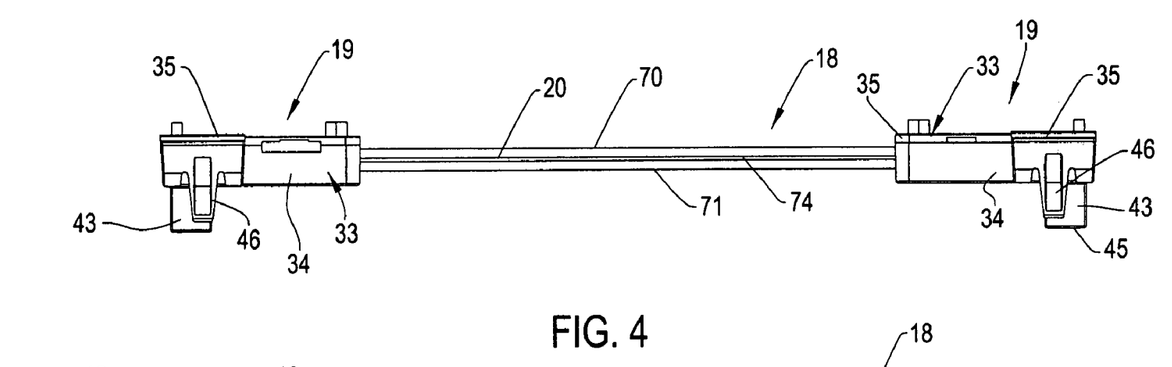
FIG. 4 is a side view of the flex connector.
Figure 5:
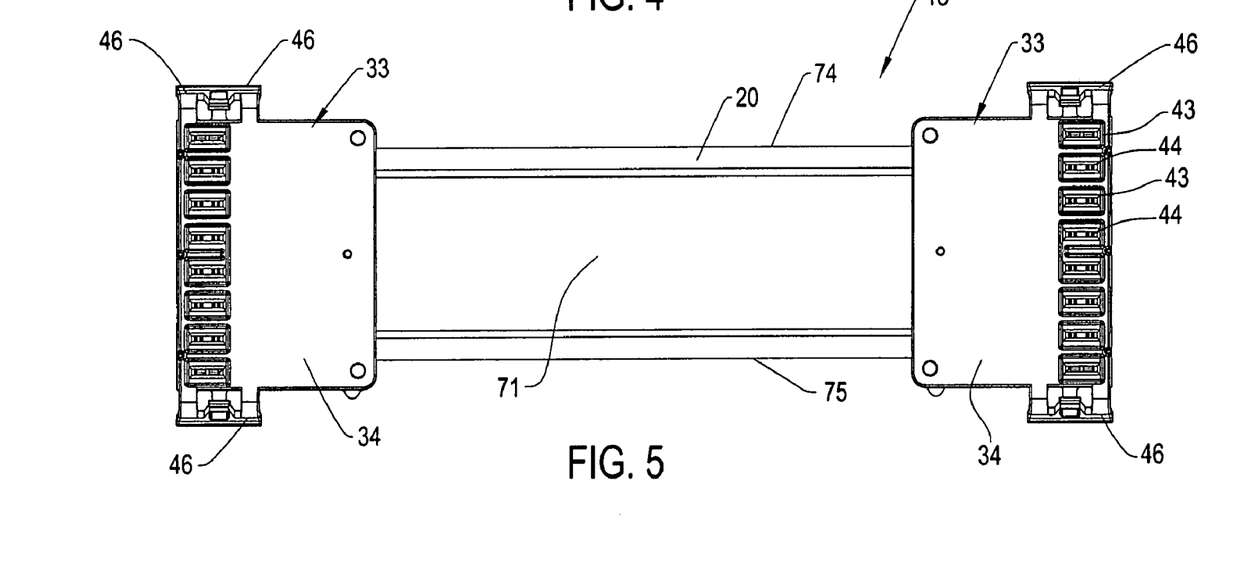
FIG. 5 is a bottom view of the flex connector.

As to the cover 35 illustrated in FIGS. 3 and 9, this cover 35 is generally flat and has a plurality of fastener bores 58 which are each adapted to receive a respective one of the connector pins 53 therethrough as illustrated in further detail in FIG. 6. On the inboard edge 59 of the cover 35, an additional fastener bore 60 is provided which receives the central connector pin 52 vertically therethrough. During assembly, the cover 35 is positioned with the pins 52 and 53 inserted vertically or axially through the respective bores 58 and 60 so that the head or terminal end of the pins 52 and 53 are disposed or project vertically outwardly of the respective bores 58 and 60. At this time, the exposed ends of the pins 52 and 53 are deformed through a conventional staking process to fixedly secure the cover 35 to the housing 34.

Along the inboard cover edge 59, a downwardly depending flange 62 is provided which overlies and aligns with the flange 42 formed along the closed edge of the window 40. These opposed flanges 42 and 62 are vertically aligned one above the other as seen in FIG. 12 and act like jaws to compressively engage or clamp the jacket 20 and the conductors carried therethrough. As will be described in further detail hereinafter, the compressive engagement of the flanges 42 and 62 with the jacket 20 serves to securely fasten or hold the jacket 20 and housing assemblies 33 together.

Figure 10:
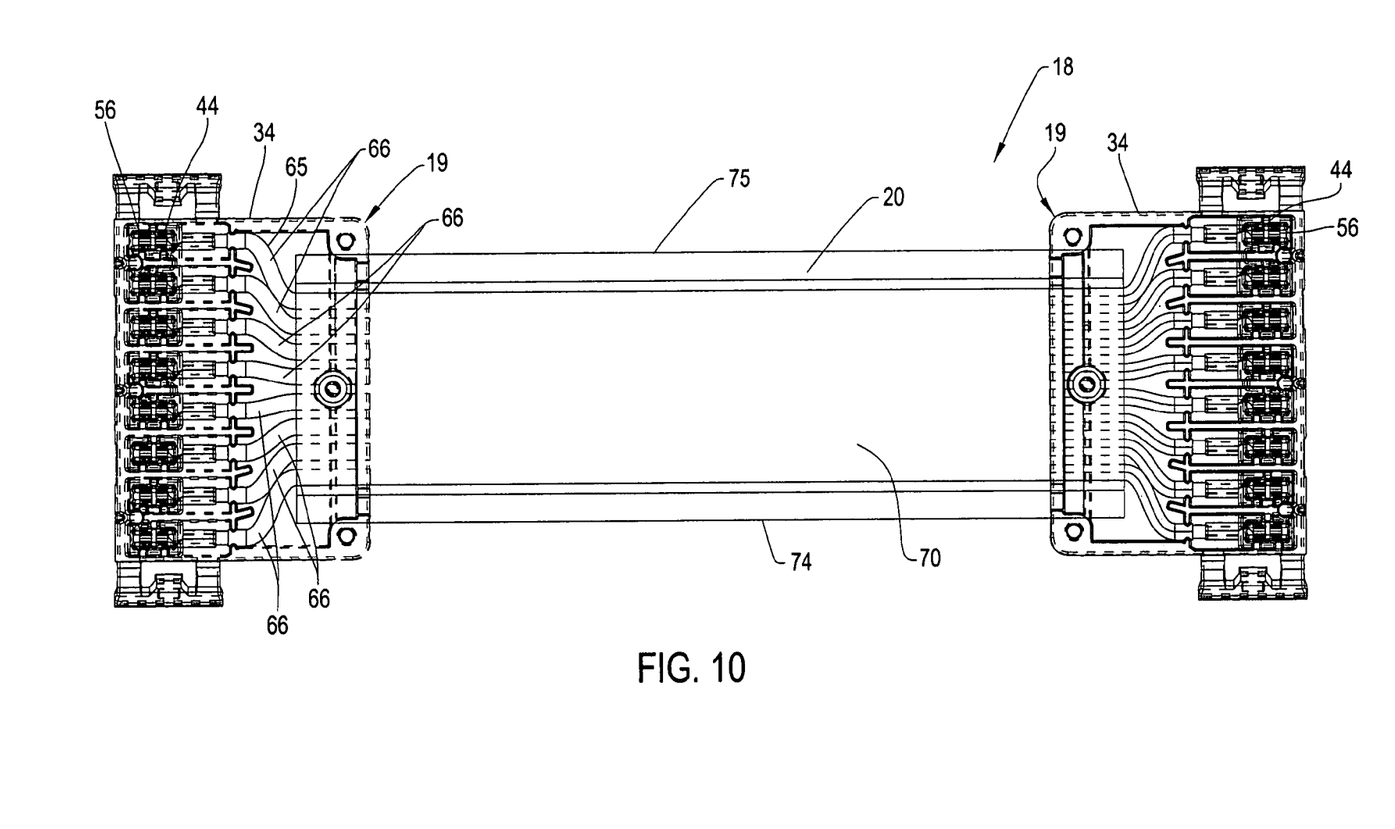
FIG. 10 is a top view of the flex connector showing interior wire assemblies.

Referring to FIG. 10, the flex connector 18 includes a plurality of conductor assemblies 65 which extend through the jacket 20 and have opposite ends seated within the connector plugs 19. These conductor assemblies 65 each comprise a wire-like conductor 66 which is pre-terminated at its opposite ends with a pair of the aforementioned electrical terminals 44. During assembly, the terminals 44 are seated within the terminal pockets 56 formed in the bottom housings 34 of the respective connector plugs 28.

A plurality of the conductor assemblies 65, and in particular, eight such conductor assemblies 65 are installed within the connector plugs 19 wherein the individual conductor wires 66 extend longitudinally through the intermediate space defined between the spaced apart connector plugs 19 of a flex connector 18. Preferably, the conductors 66 are defined by conventional current carrying wires provided with an insulative sleeve on the exterior thereof. As seen in FIG. 10, the conductor wires 66 are disposed in adjacent parallel relation so as to extend lengthwise through the flex connector 18. These wires 66 are laid co-planar with each other so as to define a single layer of such conductors 66 having the thin profile illustrated in FIG. 4. As will be described in further detail hereinafter, these conductors 66 then are enclosed by the exterior jacket 20. The conductors 66 enter each one of the housings 19 through the window 40 defined on the inboard side of the bottom housing 34. When these wires 66 are covered by the jacket 20, the window flanges 42 and 62 have a vertical spacing which snugly compresses the jacket 20 and the conductors 66 to provide secure tight-fitting engagement between such wires 66, jacket 20 and housing assembly 33 while still avoiding damage to the conductors 66.

As seen in FIGS. 9 and 12, the jacket 20 is preferably formed of one or more thin sheets of flexible jacket material, preferably plastic sheets, which define top and bottom jacket layers 70 and 71 which are superimposed one above the other. The jacket layers 70 and 71 are shown in spaced relation to define an interior conductor passage 72 which extends horizontally along the entire length of the jacket 20. It is noted that the drawings show the jacket layers 70 and 71 vertically separated from each other along the axial length, although the flexible sheet material from which the layers 70 and 71 are formed would allow the jacket layers 70 and 71 to lie or collapse against each other under normal conditions if the conductors 66 were not provided within the passage 72. Preferably, the sheet material is formed of a low-density polyethylene (LDPE) or other suitable flexible jacket material such as other types of thermo plastic elastomer. This sheet material typically would be provided as a stock of such sheet material which then is cut to the appropriate size required for the jacket layers 70 and 71. In this regard, the sheet material could be provided in a long length such as a spool of such material, wherein the sheet material is then fed to a cutting machine which cuts the sheet material to the appropriate length required for the length of the jacket layers 70 and 71.

The jacket layers 70 and 71 are defined by opposite side edges 74 and 75, which extend longitudinally, and transverse end edges 76 and 77 which extend transversely to the side edges 74 and 75. It is noted that in the region of the side edges 74 and 75, the jacket layers 70 and 71 define two superimposed edge sections which lie closely against each other in facing relation while interiorly thereof, the jacket layers 70 and 71 can vertically separate to define the conductor passage 72. As will be described hereinafter, the two superimposed jacket layers 70 and 71 along the side edges 74 and 75 are immovably fixed or joined together so as to completely enclose the conductors 66 within the conductor passage 72. Preferably, one or both of the side edges 74 and 75 is defined by superimposed, terminal free edges of the two jacket layers 70 and 71 which are initially formed separate of each other and then are aligned along the longitudinal length of the jacket 20 in stacked relation.

In the preferred embodiment, the jacket layers 70 and 71 are defined by two, separated or independent sheets of the sheet material so that the terminal free edges of these sheets define the two opposite side edges 74 and 75. These free edges would then be fixedly joined together edgewise along the length of each of the side edges 74 and 75. As will be described in further detail hereinafter, the layers 70 and 71 preferably are bonded directly to each other along the entire length of the side edges 74 and 75 by a suitable joining process such as heat sealing, adhesives or the like which effect a permanent bond between the two material layers. In this regard, the side edge regions of the layers 70 and 71 essentially define edge interfaces 79 and 80 which are those side portions of the layers 70 and 71 which are in direct contact with each other outwardly of the conductor passage 72. Thus, edgewise portions of the transverse width of the layers 70 and 71 are disposed in direct contact with each other in the preferred embodiment which allows for subsequent heat sealing or bonding along these edge interfaces 79 and 80. This permanently bonds the two layers 70 and 71 together and completely encloses the conductor 66.

Figure 14:
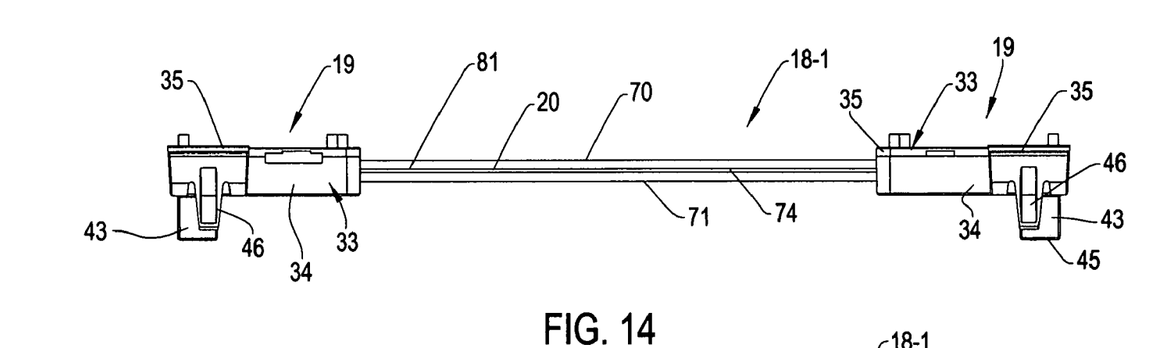
FIG. 14 is a side view of a further flex connector.
Figure 15:
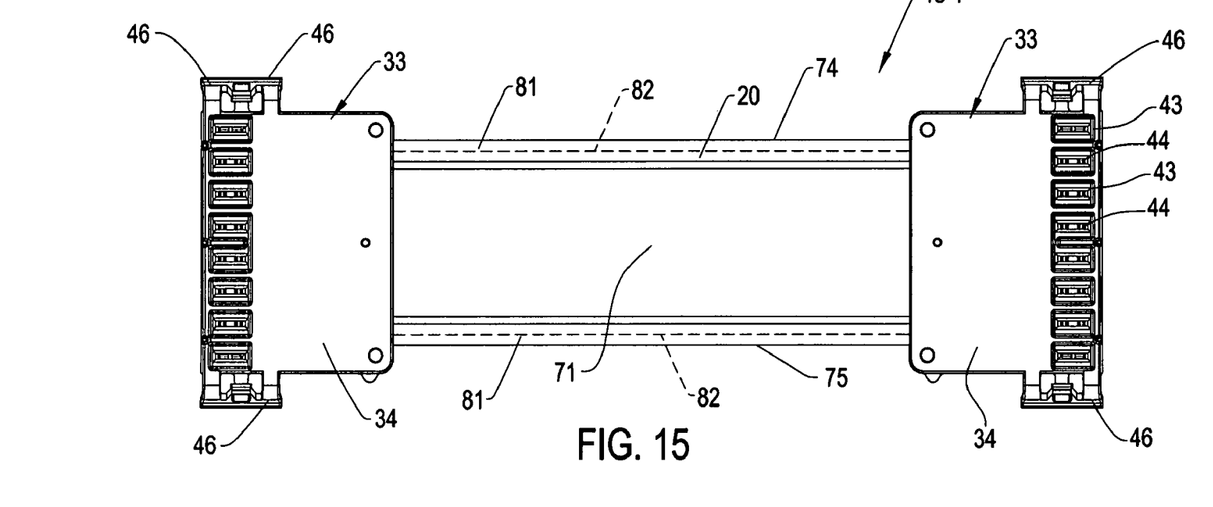
FIG. 15 is a bottom view of the flex connector of FIG. 14.

It will also be understood that the bonding or joining may be effected by physical fastener structure such as stapling, sewing or a snap lock or zip lock fastener which extends edgewise along one or both of the side edges 74 and 75 to join the edge interfaces 79 and 80. This fastener structure would provide a suitable fastening force which would prevent unintended separation of the jacket layers 70 and 71. FIGS. 14 and 15 illustrate a modified flex connector 18-1 which has common components identified with the same reference numerals. In this embodiment, the jacket 20 extends between the connector plugs 19 and is connected thereto in the same manner disclosed above.

As to the jacket edges 74 and 75 defining along the jacket layers 70 and 71, these edges 74 and 75 preferably have flat sections 81 which are then hemmed or fastened by fasteners diagrammatically depicted by fastener lines 82. These fastener lines 82 represent the various fasteners such as stapling, sewing or a continuous zip lock fastener.

While the layers 70 and 71 preferably are formed by two separate sheets joined along both edges 74 and 75 in the above-described embodiments, these layers 70 and 71 also may be defined by a single sheet which is folded over upon itself to define the two layers 70 and 71. In this manner, one side of the single sheet would define the jacket layer 70 wherein the fold line or crease would extend along one side edge, such as side edge 75, with the free edges of the sheet material defining the opposite side edge 74. In this manner, the edge-wise bonding or joining would only be required along the one side edge 74. In this regard, it is possible to form the sheet material with a hinge structure such as a living hinge which would extend along the side edge 75 and facilitate the folding action which superimposes the top jacket layer 70 on the bottom layer 71.

Referring to FIGS. 9, 11 and 12, each of the jacket layers 70 and 71 also is provided with respective alignment holes 83 and 84 formed near the end edges 76 and 77 so as to fit onto the above-described locator posts 49 that are formed in the connector plugs 19. Therefore, during assembly, the opposite ends of the bottom jacket layer 71 are first positioned in the plug housing 34 by seating the respective alignment holes 84 onto the locator pins 49. This serves to align and position the jacket layer 71 relative to the bottom housings 34 and also helps provide a secure connection therebetween.

With the jacket layer 71 in position, but the top surface thereof exposed, the conductor assemblies 65 are then installed in the bottom housings 34 with the intermediate conductor 66 extending across the top or inner jacket face 85 of layer 71. Thereafter, the top jacket layer 70 is then positioned with its alignment holes 83 being slid onto the locator posts 49 so as to overlie the bottom layer 71. In this position, the inner jacket face 86 of layer 70 (FIG. 11) then covers the row of conductors 66 that are now extending through the conductor passage 72.

Thereafter, the housing cover 35 is positioned on the connector pins 52 and 53 and secured by deformation of the pins 52 and 53 through a staking operation or other similar fastening method. At this point in time, the ends of the jacket layers 70 and 71 are then fixedly secured between the opposed flanges 42 and 62 that are provided in the housing assembly 33. This ensures that the jacket layers 70 and 71 are maintained in alignment even though one or both of the edge interfaces 79 and 80 remains unjoined. At this point in time, a joining operation is then performed along one or both of the side edges 74 and 75 to edgewise bond or join one or both of the edge interfaces 79 and 80 together as described above.

Hence, the invention relates to the above-described construction of the flex connector 18 which is improved through the use of the flexible jacket 70 that is formed of sheet material that has substantial flexibility and allows flexing without requiring any openings into the conductor passage 72. This jacket 70 facilitates bending of the connector plugs 19 relative to each other and, if necessary, twisting or other manipulations of one plug 19 relative to the other plug 19.

Figure 13:
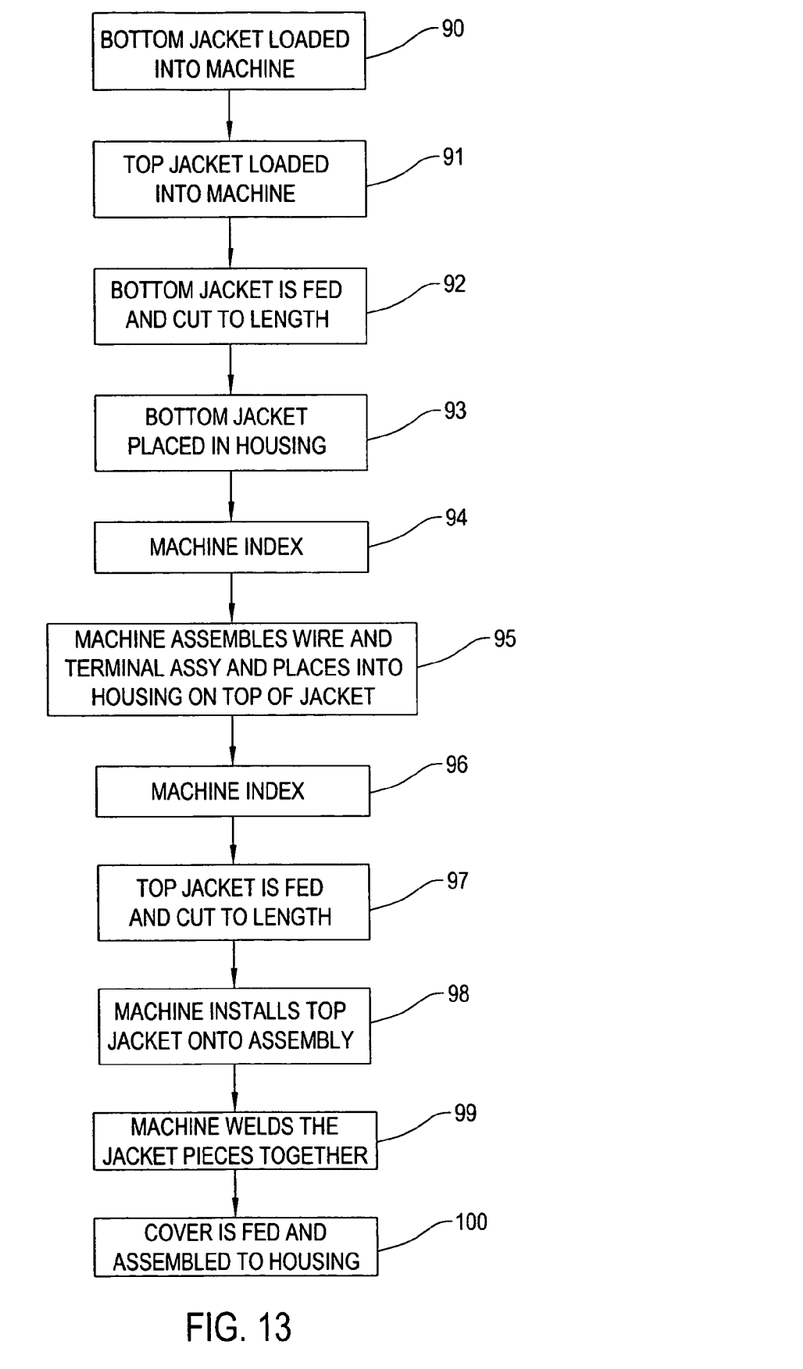
FIG. 13 is a flow chart showing the manufacturing process of the invention.

In addition to this structure, the invention relates to an improved manufacturing process. More particularly as to this process, FIG. 13 diagrammatically illustrates the manufacturing process for assembling the flex connector 18. This process is performed through an assembly machine constructed in accord with the following discussion.

More particularly, the machine allows for loading of the sheet material therein wherein a stock of bottom jacket material is loaded into the machine at step 90 and a stock of top jacket sheet material is loaded into the machine in step 91. The machine also provides for initial positioning of the bottom housings 34 into the machine at appropriate spaced-apart locations.

Thereafter, the bottom jacket is fed and then cut to length at step 92 with the bottom jacket layer 70 then being placed on the bottom housings in step 93. This placement of the bottom jacket layer 71 into the bottom housing 34 is accomplished by placing the respective alignment holes 84 onto the locator posts 49 of the bottom housings 34. In this manner, the bottom housing 34 and the bottom jacket layer 71 are initially preassembled, after which the machine is indexed to a wire assembly and installation station.

In step 95, the assembly machine then assembles the conductors 66 and terminals 44 together so that the conductors 66 are pre-terminated and form the conductor assembly 65. At this station in step 95, the machine then places the conductor assemblies 65 into the bottom housings 34 with the respective conductors 66 lying on top of the bottom jacket layer 71. Thereafter, the machine is indexed in step 96 to position this sub-assembly of components for positioning of the top jacket layer 71. In step 97, the top jacket layer material is then fed an appropriate length and cut to length so that the top jacket layer 70 corresponds to the length of the bottom jacket layer 71. In step 98, the assembly machine installs the top jacket layer 70 onto the aforementioned sub-assembly so that the top jacket layer 70 has its alignment holes 83 slid onto the locator posts 49 and the jacket layer 70 is now super-imposed above the jacket layer 71 with the conductors 66 extending through the conductor passage 72 defined therebetween. In step 99, the assembly machine then edgewise joins the opposite side edges 74 and 75 together through suitable bonding such as by plastics welding, heat sealing, or the like.

In step 100, the housing covers 35 are then fed to the appropriate station and positioned on the bottom housing 34 with the connector pins 52 and 53 being staked to fix these components together and form a final assembly for the flex connector 18.

With respect to the above-described manufacturing process, this process also could be modified in the event that the jacket layers 70 and 71 are formed from a single sheet of folded material. In this regard, the sheet material would be loaded into the machine, cut to a common length appropriate for the jacket layers 70 and 71, with the bottom jacket layer 71 being positioned with the sheet material in an unfolded condition on the bottom housings 34. After step 95 wherein the terminal/conductor assemblies 65 are installed, the top jacket layer 70 would be folded over the bottom jacket layer 71 and then the free edges are edgewise joined together. Next, step 100 would be performed to complete the assembly.

With the foregoing arrangement, an improved flex connector 18 is provided.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A flex connector for a modular power distribution assembly comprising:
    at least one plug connector having a housing defining a hollow interior, a window providing access to said hollow interior, and a plurality of conductor assemblies each comprising a contact terminal seated in said housing and accessible from an exterior thereof, and an elongate conductor having one end connected to said terminal and a length extending out of said hollow interior through said window, said conductors each extending out of said window in parallel, side-by-side relation; and
    a conductor jacket comprising superimposed first and second jacket layers of a thin, flexible sheet material which define an interior conductor passage through which said conductors extend, said first and second jacket layers including longitudinal opposite side edges extending edgewise away from said plug connector and transverse end edges defined on the opposite end sections of said jacket, said jacket layers each having at least one terminal free edge along one of said side edges wherein said free edges of the first and second jacket layers are aligned, and are edgewise joined along their length which provides for fixed securement of the jacket layers along such free edges.

2. The flex connector according to claim 1, wherein said first and second jacket layers are edgewise joined along both of said opposite side edges.

3. The flex connector according to claim 2, wherein said first and second jacket layers have opposing faces which are bonded together.

4. The flex connector according to claim 1, wherein said first and second jacket layers have opposing faces which are bonded together.

5. The flex connector according to claim 1, wherein said housing has an alignment post proximate said window which projects transverse to opposite exterior faces of said first and second jacket layers, said first and second jacket layers having predefined alignment openings formed through said exterior faces proximate one of said end sections, said alignment openings being aligned in registry and receiving said alignment post therethrough to fix and align said jacket within said window.

6. The flex connector according to claim 5, wherein said housing comprises first and second housing bodies which join together and define opposite window side edges of said window, each of said first and second housing bodies including projecting flanges along said window side edges which compressively engage the opposite side faces of said jacket and said conductors within said conductor passage.

7. The flex connector according to claim 1, wherein said housing comprises first and second housing bodies which join together and define opposite window side edges of said window, each of said first and second housing bodies including projecting flanges along said window side edges which compressively engage the opposite side faces of said jacket and said conductors within said conductor passage.

8. A method for manufacturing a flex connector of a power distribution system, the method comprising the steps of:
    providing at least a first housing section of a housing assembly for a connector plug, said housing assembly having terminal ports for plugging engagement to another system component, an access window and a locator pin adjacent said window in said first housing section;
    laying a bottom jacket layer of a jacket material so that an alignment hole at one of the opposite ends of the bottom jacket layer fits onto the respective locator pin;
    providing a plurality of conductor assemblies each comprising an electrical conductor and an electrical terminal preterminated at one end thereof;
    positioning the conductors on a top surface of the bottom jacket layer with the electrical terminals on the one end of the conductors being positioned within the first housing section, said conductors being in parallel relation;
    laying a top jacket layer so as to overlie the parallel conductors with an alignment hole in said top jacket layer being fitted on the locator pin so that said top and bottom jacket layers are aligned with free edges thereof being longitudinally parallel and aligned one above the other;
    positioning a second housing section on the first housing section and fixedly securing said first and second housing sections together to define said housing assembly; and
    edgewise joining aligned, free edges of said first and second jacket layers together along their length which provides for fixed securement of said first and second jacket layers along such free edges.

9. The method according to claim 8, wherein said first and second housing sections have respective flanges along said window which compressively secure the ends of the first and second jacket layers within said window of said housing assembly.

10. The method according to claim 8, which includes the step of positioning a plurality of said first housing sections in spaced apart locations to define a respective plurality of said housing assemblies, wherein each pair of said housing assemblies has said top and bottom jacket layers extending therebetween to form an intermediate said jacket.

11. The method according to claim 10, wherein said top and bottom jacket layers include alignment holes at the opposite ends of the top and bottom jacket layers which fit onto the respective locator pins.

12. The method according to claim 11, wherein said first and second housing sections of both of said housing assemblies have respective flanges along said windows which compressively secure the opposite ends of the first and second jacket layers within said windows of said housing assemblies.

13. A method for manufacturing a flex connector of a power distribution system, the method comprising the steps of:
- providing at least a first housing section of a housing assembly for a connector plug, said housing assembly having terminal ports for plugging engagement to another system component, and an access window at one housing end;
- laying a bottom jacket layer of a flexible jacket material so that one of the opposite ends of the bottom jacket layer extends through said access window and fits within said first housing section;
- providing a plurality of conductor assemblies each comprising an electrical conductor and an electrical terminal preterminated at one end thereof;
- positioning the conductors on a top surface of the bottom jacket layer with the electrical terminals on the one end of the conductors being positioned within the first housing section, said conductors being in parallel relation;
- laying a top jacket layer of a flexible jacket material so that one of the opposite ends of the top jacket layer extends through said access window and fits within said first housing section, and said top jacket layer overlies the parallel conductors with said top and bottom jacket layers being aligned with respective free edges thereof being longitudinally parallel and aligned one above the other;
- positioning a second housing section on the first housing section and fixedly securing said first and second housing sections together to define said housing assembly with said first and second housing sections fixedly securing said respective ends within said access window; and
- edgewise joining said aligned, free edges of said first and second jacket layers together along their length which provides for fixed securement of said first and second jacket layers along such free edges.

14. The method according to claim 13, wherein said first and second housing sections have respective flanges along said window which compressively secure the ends of the first and second jacket layers within said access window of said housing assembly.

15. The method according to claim 14, which includes the step of positioning a plurality of said first housing sections in spaced apart locations to define a respective plurality of said housing assemblies, wherein each pair of said housing assemblies has said top and bottom jacket layers extending therebetween to form an intermediate said jacket.

16. The method according to claim 15, wherein said first and second housing sections of both of said housing assemblies have respective flanges along said windows which compressively secure the opposite ends of the first and second jacket layers within said windows of said housing assemblies.

17. The method according to claim 16, wherein said housing assemblies each include a locator pin located adjacent said access window thereof for locating said top and bottom jacket layers relative to said housing assemblies.

18. The method according to claim 17, wherein said top and bottom jacket layers include alignment holes at the opposite ends of the top and bottom jacket layers which fit onto the respective locator pins.

19. The method according to claim 13, wherein said edgewise joining step comprises bonding of said free edges along an entire length thereof.

20. The method according to claim 19, wherein said edgewise joining step comprises joining of said free edges along an entire length thereof by mechanical fastening means.

\* \* \* \* \*